(12) United States Patent
Yamaguchi

(10) Patent No.: US 12,089,767 B2
(45) Date of Patent: Sep. 17, 2024

(54) COOKING INGREDIENT SUPPLYING DEVICE

(71) Applicant: TECHMAGIC INC., Tokyo (JP)

(72) Inventor: Takafumi Yamaguchi, Tokyo (JP)

(73) Assignee: TECHMAGIC INC., Tokyo (JP)

( * ) Notice: Subject to any disclaimer, the term of this patent is extended or adjusted under 35 U.S.C. 154(b) by 0 days.

(21) Appl. No.: 18/586,522

(22) Filed: Feb. 25, 2024

(65) Prior Publication Data

US 2024/0245250 A1 Jul. 25, 2024

Related U.S. Application Data

(63) Continuation of application No. PCT/JP2022/016249, filed on Mar. 30, 2022.

(30) Foreign Application Priority Data

Aug. 26, 2021 (JP) .................................. 2021-138230

(51) Int. Cl.
*A47J 27/00* (2006.01)
(52) U.S. Cl.
CPC ................... *A47J 27/002* (2013.01)
(58) Field of Classification Search
CPC ...... A47J 27/002; A47J 27/004; A47J 36/165; A47J 43/046; A47J 43/044; A47J 43/082; A47J 27/00; A47J 43/0727; A47J 2043/04454; A47J 27/14; A47J 36/06; A47J 36/2483; A47J 36/26; A47J 36/32; A47J 36/34; A47J 37/047; A47J 43/042; A47J 43/06; A47J 43/0716; A47J 43/087; A47J 44/00; A47J 2043/04463; A47J 31/60; A47J 36/321; A47J 37/105; A47J 43/04; A47J 43/0766; A47J 43/0772; A47J 43/0777; A47J 43/08; A47J 43/085; A47J 36/00; A47J 2027/043; A47J 43/0722
USPC ......... 99/325, 326, 331, 337, 338, 342, 352, 99/357, 427, 523, 468, 486, 2, 80, 356, 99/390, 494, 448–449, 516
See application file for complete search history.

(56) References Cited

U.S. PATENT DOCUMENTS

2020/0128633 A1* 4/2020 Park .................... A47J 37/0629
2021/0321813 A1* 10/2021 Shiraki .................. A47J 27/18

FOREIGN PATENT DOCUMENTS

| CN | 111003439 A | 4/2020 |
|----|-------------|--------|
| JP | S50-070097 A | 6/1975 |
| JP | H06-339346 A | 12/1994 |
| JP | H10-334335 A | 12/1998 |
| JP | 2021121305 A | 8/2021 |
| WO | 2020166723 A2 | 8/2020 |

* cited by examiner

*Primary Examiner* — Phuong T Nguyen
(74) *Attorney, Agent, or Firm* — HAUPTMAN HAM, LLP

(57) ABSTRACT

Provided is a cooking ingredient supplying device that allows easy removal and refilling of ingredient blocks. In a cooking ingredient supplying device in which a plurality of ingredient blocks M are placed on a tray and an ingredient feeding member is driven by a drive mechanism to sequentially feed and supply the ingredient blocks M from the ray in a temperature-retention cabinet body, the tray is provided so as to be pulled out from the temperature-retention cabinet body in a tray pull-out direction (Y direction) that intersects with an ingredient feed direction (X direction) by the ingredient feeding member.

4 Claims, 8 Drawing Sheets

COOKING INGREDIENT SUPPLYING DEVICE

RELATED APPLICATIONS

The present application is a continuation application of International Application Number PCT/JP2022/016249 filed Mar. 30, 2022, which claims the benefit of priority to Japanese Patent Application No. 2021-138230, filed on Aug. 26, 2021, the disclosures of which applications are hereby incorporated by reference herein in their entirety.

FIELD

The present invention relates to an ingredient block supplying device, and particularly to a cooking ingredient supplying device for supplying ingredient blocks in a temperature-retention cabinet body to another device and refilling the temperature-retention cabinet body with new ingredient blocks.

BACKGROUND

In recent years, for example, due to the shortage of employees in restaurants, there has been a demand to automate part or all of a cooking process. This demand has pushed development of various cooking devices that automate part of the cooking process as well as automatic dish serving systems that integrate and automate these devices.

One example of conventional automatic dish serving systems capable of cooking a wide variety of cooking ingredients in response to customer orders is an automatic noodle dish serving system in which an ingredient supplying device accommodating frozen noodles at a retained temperature, a boiler, a washing machine for washing cooking containers, a heat-cooking device capable of heat cooking, and a dish up device for dishing up cooked food on a serving container are arranged in series on a cooking floor. (See Patent Literature 1.)

CITATION LIST

Patent Literature

Patent Literature 1: WO/2020/166723 (in particular, see claim 8, FIG. 4)

SUMMARY

Technical Problem

In the conventional automatic noodle dish serving system as described above, a noodle supplying device is arranged in series adjacently to a heat-cooking device in order to supply frozen noodles accommodated in the noodle supplying device at a retained temperature to the heat-cooking device for immediate cooking.

However, if the noodle supplying device deployed in such an automatic noodle dish serving system is designed such that the noodle supplying device is refilled with frozen noodles from the heat-cooking device side or the upstream side opposite thereto, the installation space of the automatic noodle dish serving system is elongated. This prevents size reduction of the automatic noodle dish serving system and limits its physical installation space. In particular, if the system is designed such that the noodle supplying device is refilled with frozen noodles on the heat-cooking device side, space enough for the frozen noodle refilling operation is unable to be ensured between the noodle supplying device and the heat-cooking device, so the frozen noodle refilling operation on the far end side of the noodle supplying device is difficult and inconvenient.

On the other hand, if the system is designed such that the noodle supplying device is refilled with frozen noodles from the upstream side, which is the opposite side of the heat-cooking device, the frozen noodles in the noodle supplying device are exposed to the external air-conditioned environment through openings on both the frozen noodle refill side and supply side, and condensation easily occurs. This condensed moisture deteriorates the quality of the frozen noodles, making it difficult to maintain the unique flavor of the frozen noodles, and necessitating sufficient sanitary control for accommodating the frozen noodles.

In more detail, in general, noodles are tasty when fresh noodles are eaten immediately after being boiled, but the cooking takes time. For this reason, frozen noodles are often used, in which pre-cooked boiled noodles are frozen for storage to prevent beta starch formation. Quality maintenance and sanitary control for these frozen noodles are important.

An object of the present invention is to solve the problem of conventional technologies as described above and to provide a cooking ingredient supplying device that reduces the installation space of the automatic dish serving system to expand the degree of freedom of installation location, accommodates and controls ingredient blocks in a sanitary manner while maintaining the flavor of the ingredients, and achieves quick and easy refilling of ingredient blocks.

Solution to Problem

In order to solve the problem described above, an aspect of the invention according to claim 1 provides a cooking ingredient supplying device comprising: a body configured to accommodate a plurality of ingredients; an ingredient storage unit disposed in interior of the body and configured to store the ingredients; a tray mounted in the ingredient storage unit, the ingredients being aligned and placed on the tray; an ingredient supply door disposed on the body and openable and closable on a side of another device installed adjacently; and a refill door disposed on the body and configured to allow the tray to be refilled with the ingredients, wherein the ingredient storage unit includes an ingredient feeding member configured to feed the ingredients on the tray toward the ingredient supply door, the tray is disposed so as to be pulled out from interior of the body toward the refill door in a tray pull-out direction that intersects with an ingredient feed direction of the ingredient feeding member, the ingredient storage unit includes a drive mechanism configured to drive the ingredient feeding member and a transmission disengagement mechanism configured to disengage the drive mechanism in conjunction with pull-out operation of the tray, the drive mechanism includes a driving transmission member coupled to a power source and a driven transmission member configured to transmit power of the driving transmission member to the ingredient feeding member, and the transmission disengagement mechanism includes a lever mechanism configured to perform pull-out operation of the tray and a link mechanism configured to disengage power transmission from the driving transmission member to the driven transmission member by the lever mechanism.

An aspect of the invention according to claim 2 is the aspect of the cooking ingredient supplying device according to claim 1, in which the driven transmission member has a driven shaft disposed along the ingredient feed direction, and the tray is capable of being pulled out together with the ingredient feeding member.

An aspect of the invention according to claim 3 is the aspect of the cooking ingredient supplying device according to claim 1, in which the lever mechanism includes a lock portion capable of locking a housed position of the tray within the temperature-retention cabinet body.

An aspect of the invention according to claim 4 is the aspect of the cooking ingredient supplying device according to claim 1, in which the lever mechanism is disposed inside the refill door.

Since the cooking ingredient supplying device of the present invention includes a temperature-retention cabinet body configured to accommodate multiple ingredient blocks at a retained temperature, an ingredient storage unit disposed in interior of the temperature-retention cabinet body and configured to store the multiple ingredient blocks, a tray mounted in the ingredient storage unit, the multiple ingredient blocks being aligned and placed on the tray, an ingredient supply door disposed on the temperature-retention cabinet body and openable and closable on a side of another device installed adjacently, and a refill door disposed on the temperature-retention cabinet body and configured to allow the tray to be refilled with the ingredient blocks, multiple frozen noodle blocks are accommodated at a retained temperature in the temperature-retention cabinet body, ingredient blocks individually aligned and placed on the tray of the ingredient storage unit in the temperature-retention cabinet body can be supplied to another device through the ingredient supply door of the temperature-retention cabinet body, and the temperature-retention cabinet body can be refilled with new ingredient blocks through the refill door of the temperature-retention cabinet body. In addition, the ingredient blocks in the cooking ingredient supplying device are not inadvertently exposed to the outside air-conditioned environment, thus maintaining the unique flavor of the ingredients, sufficient sanitary control for accommodating ingredients can be achieved, and, moreover, the following effects unique to the cooking ingredient supplying device of the present invention can be achieved.

That is, in the cooking ingredient supplying device in the aspect of the invention according to claim 1, since the ingredient storage unit includes the ingredient feeding member that sequentially feeds multiple ingredient blocks on the tray toward the supply door, space for refilling ingredient blocks is ensured on the refill door side, which is the front side of the temperature-retention cabinet body, so that unlike the conventional automatic noodle dish serving system, refilling of ingredient blocks from the heat-cooking device side or the opposite side thereof, that is, the upstream side, of the cooking ingredient supplying device is avoided, thereby reducing the installation space of the automatic dish serving system and expanding the degree of freedom of its physical installation location.

Furthermore, since the tray is provided so as to be pulled out from the interior of the temperature-retention cabinet body toward the refill door in the tray pull-out direction that intersects with the ingredient feed direction of the ingredient feeding member, refilling the cooking ingredient supplying device with ingredient blocks is performed on the front side of the cooking ingredient supplying device, which is the refill door side different from the side on which ingredient blocks are supplied from the cooking ingredient supplying device to the heating-cooking device, so that quick and easy refilling operation of ingredient blocks can be achieved.

In addition, in the cooking ingredient supplying device in the aspect of the invention according to claim 1, since the ingredient storage unit includes the drive mechanism that drives the ingredient feeding member and the transmission disengagement mechanism that disengages the drive mechanism in conjunction with the pull-out operation of the tray, the power transmission of the drive mechanism to the ingredient feeding member is disengaged to stop the supply operation of the ingredient feeding member at the same time as the pull-out operation of the tray, so that the tray pulled out can be refilled with ingredient blocks reliably and safely.

In addition, in the cooking ingredient supplying device in the aspect of the invention according to claim 1, since the transmission disengagement mechanism has the lever mechanism that performs pull-out operation of the tray and the link mechanism that disengages power transmission from the driving transmission member to the driven transmission member by this lever mechanism, the power transmission from the driving transmission member to the driven transmission member is disengaged by lever operation, so that the tray can be pulled out easily and quickly, and as a result, deterioration of ingredient blocks and contamination from the external air-conditioned environment can be suppressed more during removal and refilling of ingredient blocks.

In the cooking ingredient supplying device in the aspect of the invention according to claim 2, in addition to the effect of the cooking ingredient supplying device according to claim 1, since the drive mechanism has the driving transmission member coupled to a power source and the driven transmission member that transmits the power of the driving transmission member to the noodle feeding member, the driven shaft of the driven transmission member is arranged along the ingredient feed direction, and the tray can be pulled out together with the ingredient feeding member, the ingredient feeding member is pulled out together with the tray, so that reliable removal and refilling of ingredient blocks can be sequentially achieved by pulling out the tray with the ingredient feeding member held on the tray and following the ingredient feeding member, and removal and refilling of ingredient blocks can be performed in a short time more easily without effort. As a result, deterioration of ingredient blocks and contamination from the external air-conditioned environment can be suppressed during removal and refilling of ingredient blocks.

In the cooking ingredient supplying device in the aspect of the invention according to claim 3, in addition to the effect of the cooking ingredient supplying device according to claim 1, since the lever mechanism includes the lock portion that can lock the housed position of the tray within the temperature-retention cabinet body, when the lever mechanism is not operated by lever operation, the tray is reliably and safely housed and fixed in the temperature-retention cabinet body, so that the tray is prevented from accidentally popping out of the temperature-retention cabinet body, whereas when the lever mechanism is operated by lever operation, power transmission from the driving transmission member to the driven transmission member is disengaged and at the same time the locking by the lock portion is released to stop the supply operation of the ingredient feeding member, so that the tray can be smoothly pulled out from inside the temperature-retention cabinet body while the supply operation of the ingredient feeding member is completely stopped.

In the cooking ingredient supplying device in the aspect of the invention according to claim 4, in addition to the effect of the cooking ingredient supplying device according to claim 1, since the lever mechanism is provided inside the refill door, the disengagement operation of power transmission from the driving transmission member to the driven transmission member and the pull-out operation of the tray are instantly performed by a single action with the lever mechanism provided inside the refill door, so that the accommodated state of ingredient blocks in the temperature-retention cabinet body can be controlled in a more sanitary manner in removal and refilling of ingredient blocks.

DESCRIPTION OF EMBODIMENTS

Figure 1:
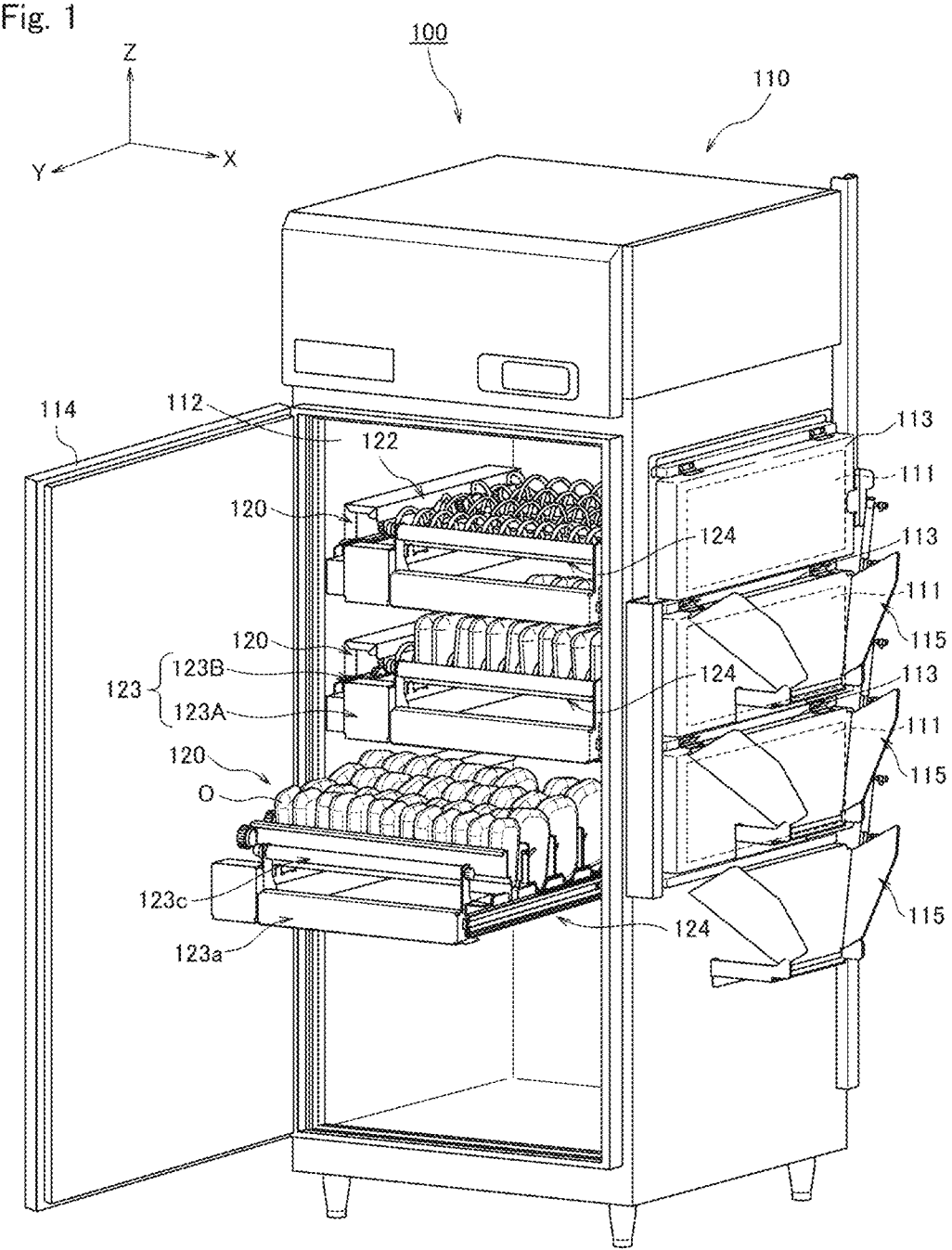
FIG. 1 is a perspective view illustrating an overview of a frozen noodle supplying device which is an example of a cooking ingredient supplying device of the present invention.

A specific embodiment of the present invention may be any cooking ingredient supplying device including a temperature-retention cabinet body configured to accommodate multiple ingredient blocks at a retained temperature, an ingredient storage unit disposed in interior of the temperature-retention cabinet body and configured to store the multiple ingredient blocks, a tray mounted in the ingredient storage unit, the multiple ingredient blocks being aligned and placed on the tray, an ingredient supply door disposed on the temperature-retention cabinet body and openable and closable on a side of another device installed adjacently, and a refill door disposed on the temperature-retention cabinet body and configured to allow the tray to be refilled with the ingredient blocks, in which the ingredient storage unit includes an ingredient feeding member configured to sequentially feed the ingredient blocks on the tray toward the ingredient supply door, and the tray is disposed so as to be pulled out from interior of the temperature-retention cabinet body toward the refill door in a tray pull-out direction that intersects with an ingredient feed direction of the ingredient feeding member, so that the installation space of the automatic dish serving system is reduced to expand the degree of freedom of installation location, ingredient blocks are accommodated and controlled in a sanitary manner while maintaining the flavor of the ingredient blocks, and quick and easy refilling operation of ingredient blocks is achieved.

The ingredient blocks handled by the cooking ingredient supplying device of the present invention may be of any shape that can be fed as ingredient blocks by the ingredient feeding member and may be of any kind and form, either packaged or not. The ingredient blocks may be half-cooked food that has undergone simple cooking up to the final stage of cooking, as well as uncooked food, for example, fresh noodles or dried noodles, or even general foods other than noodles. Frozen noodle blocks made by boiling or steaming various kinds of noodles such as pasta (including short pasta, long pasta, flat pasta, etc.), udon, soba, and Chinese noodles, and then quickly freezing them are particularly suitable. Although the term "multiple" is used here for ingredient blocks, the number of ingredient blocks is not intended to be limited as long as the temperature-retention cabinet body can accommodate a plurality of ingredient blocks.

Furthermore, the ingredient blocks to be handled are not limited to noodles, but include a variety of ingredient blocks such as vegetables and meat.

Furthermore, in the present invention, the temperature inside the temperature-retention cabinet body is held by a temperature regulator at a temperature suitable for the stored food. That is, the inside of the temperature-retention cabinet body may be held in a frozen, refrigerated, or heated temperature range by the temperature regulator.

Embodiments of the cooking ingredient supplying device of the present invention will be described below with reference to the drawings.

In the following explanations, a description of components denoted by the same reference signs in different drawings may be omitted as they are similar to each other.

EXAMPLES

A frozen noodle supplying device which is an example of the cooking ingredient supplying device of the present invention will be described as follows based on FIGS. 1 to 5.

The X-axis positive direction illustrated in FIG. 1 is a noodle feed direction, and the Y-axis positive direction is a tray pull-out direction.

<Overview of Frozen Noodle Supplying Device 100>

A frozen noodle supplying device 100 in this example is incorporated, for example, in an integrated line that automatically serves noodle dishes made of pasta in response to orders from customers, and feeds frozen noodle blocks M, which are ingredient blocks to be used in the ordered dishes, from within a temperature-retention cabinet body 110 to supply the frozen noodle blocks M to another adjacent device (not illustrated) in the integrated line.

As used herein "another device" is not limited to any particular device and is, for example, a device that receives a frozen noodle block M supplied from the frozen noodle supplying device 100 and charges the received frozen noodle block M into a boiler. A frozen noodle delivering device is also provided to charge the frozen noodle block M from the frozen noodle supplying device 100 into the boiler. The frozen noodle delivering device receives the frozen noodle block M taken out from a supply guide 115 of the frozen noodle supplying device 100 and delivers the received frozen noodle block M to the boiler.

More specifically, when the frozen noodle delivering device is configured to deliver a boiling basket, the frozen noodle delivering device can receive a frozen noodle block M from the frozen noodle supplying device 100 in a boiling basket and deliver the boiling basket directly to a noodle boiling tank in the boiler for boiling the frozen noodle block M.

Furthermore, the boiled frozen noodle block M is delivered to the next process, and is heat-cooked with ingredients, whereby pasta is automatically cooked and served to customers according to their orders.

The frozen noodle supplying device 100 of the present embodiment includes a controller (not illustrated) to supply a frozen noodle block M according to a customer's order from an order input device to a boiling basket of the frozen noodle delivering device. The entire pasta production system includes a system controller (not illustrated). The system controller is connected to the order input device and sends a command to supply a frozen noodle block M to the controller of the frozen noodle supplying device 100, in response to a customer's order from the order input device. The controller of the frozen noodle supplying device 100 controls driving means such as a drive motor 121A and a noodle supply door 113, based on the command to supply a frozen noodle block M from the system controller, so that a frozen noodle block M is supplied to a boiling basket of the frozen noodle delivering device. The system controller also controls other devices in the pasta production system, such as the frozen noodle delivering device and the boiler, so that pasta is automatically cooked and served to customers according to their orders.

The frozen noodle block M handled by the frozen noodle supplying device 100 in this example is a block of pasta that has been boiled or steamed and then quickly frozen, for example, for single serving. As described later, small-sized pasta blocks may be stored.

Figure 2:
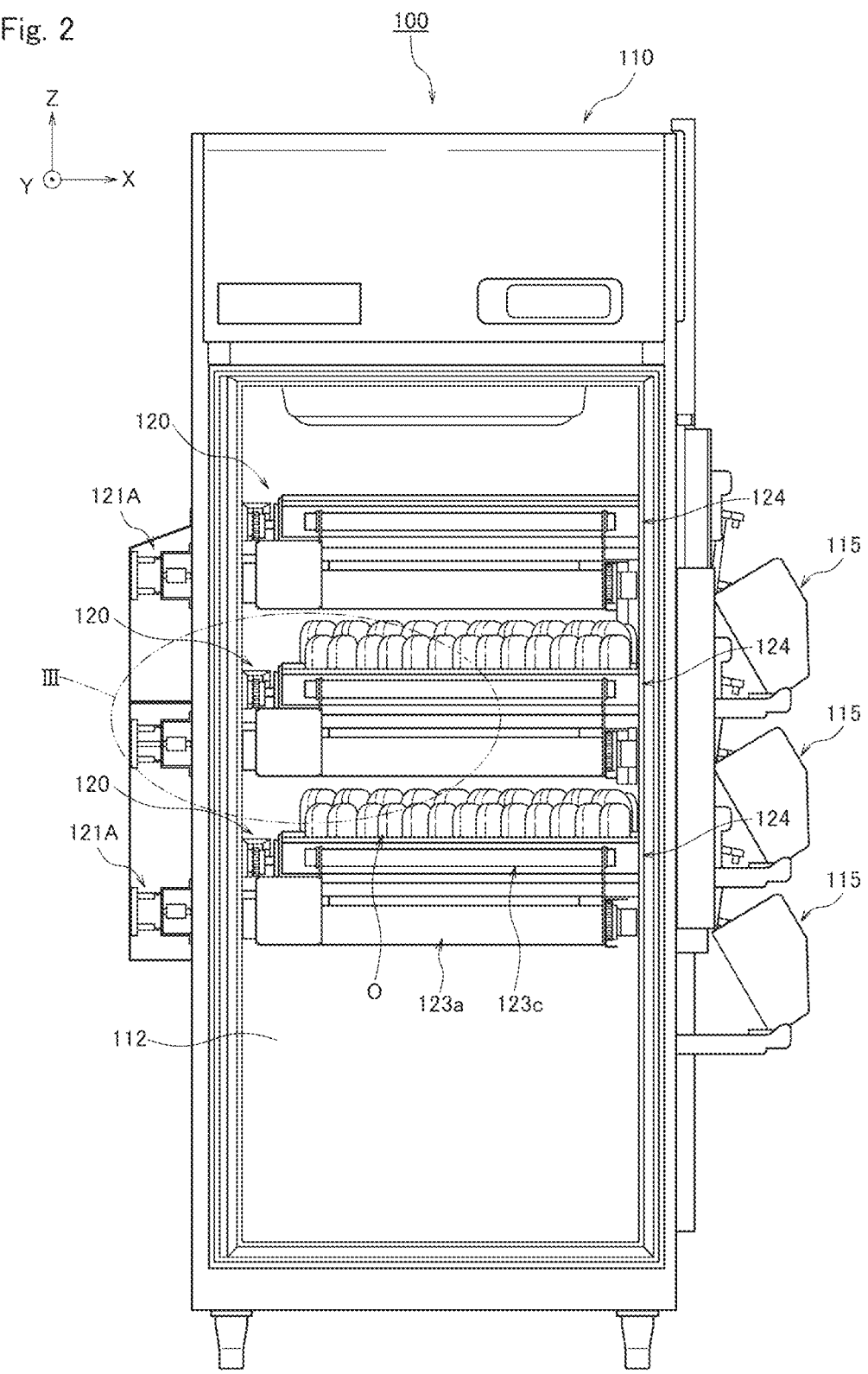
FIG. 2 is a front view as viewed from a refill door provided on the frozen noodle supplying device.

As illustrated in FIGS. 1 and 2, the frozen noodle supplying device 100 has a plurality of frozen noodle blocks M of pasta placed on each of three-layered trays 124 and feeds and supplies the frozen noodle blocks M sequentially from each tray 124 in the temperature-retention cabinet body 110 by allowing a drive mechanism 121 to drive a noodle feeding member 122 serving as an ingredient feeding member. Each tray 124 is provided so as to be pulled out from the temperature-retention cabinet body 110 toward a refill door 114 in a tray pull-out direction that intersects with a noodle feed direction of the frozen noodle block M by the noodle feeding member 122.

The frozen noodle supplying device 100 includes the temperature-retention cabinet body 110 and three ingredient storage units 120 that allow the trays 124 to be pulled out from the temperature-retention cabinet body 110 in the tray pull-out direction (Y direction) that intersects with the noodle feed direction (X direction) which is the ingredient feed direction.

(1) Specific Configuration of Temperature-Retention Cabinet Body 110

The temperature-retention cabinet body 110 is formed in a box shape having a storage space for frozen noodle blocks M inside, and has three supply-side openings 111 on a face in the noodle feed direction and a pull-out-side opening 112 on a face in the tray pull-out direction.

The temperature-retention cabinet body 110 has noodle supply doors 113, which are three ingredient supply doors that automatically open and close the corresponding supply-side openings 111, and the refill door 114 that opens and closes the pull-out-side opening 112.

A temperature regulator is provided at the top of the temperature-retention cabinet body 110 to hold the temperature of the storage space at a predetermined temperature.

In this example, the inside of the temperature-retention cabinet body 110 is held at a frozen temperature by the temperature regulator.

Each of the noodle supply doors 113 is automatically opened immediately before a frozen noodle block M to be used for a pasta dish passes through the supply-side opening 111, and automatically closed immediately after the frozen noodle block M passes through the supply-side opening 111.

With this configuration, the temperature inside the temperature-retention cabinet body 110 is maintained stably, regardless of repeated operation of feeding frozen noodle blocks M to the outside of the temperature-retention cabinet body 110.

The temperature regulator adjusts the temperature not only to a frozen temperature range but also to a temperature suitable for the frozen noodle blocks M stored in the temperature-retention cabinet body 110 to be used for pasta dishes. The temperature regulator may, for example, adjust the temperature to a heated temperature range.

When the frozen noodle supplying device 100 stores foods that can be stored at room temperature, the frozen noodle supplying device 100 does not need to have a temperature regulator.

The temperature-retention cabinet body 110 has three supply guides 115 on a face on the frozen noodle block M supply-side to allow the frozen noodle blocks M fed through the corresponding supply-side openings 111 to slide to be guided to the next processing device (not illustrated).

(2) Specific Configuration of Ingredient Storage Unit 120

Figure 3:
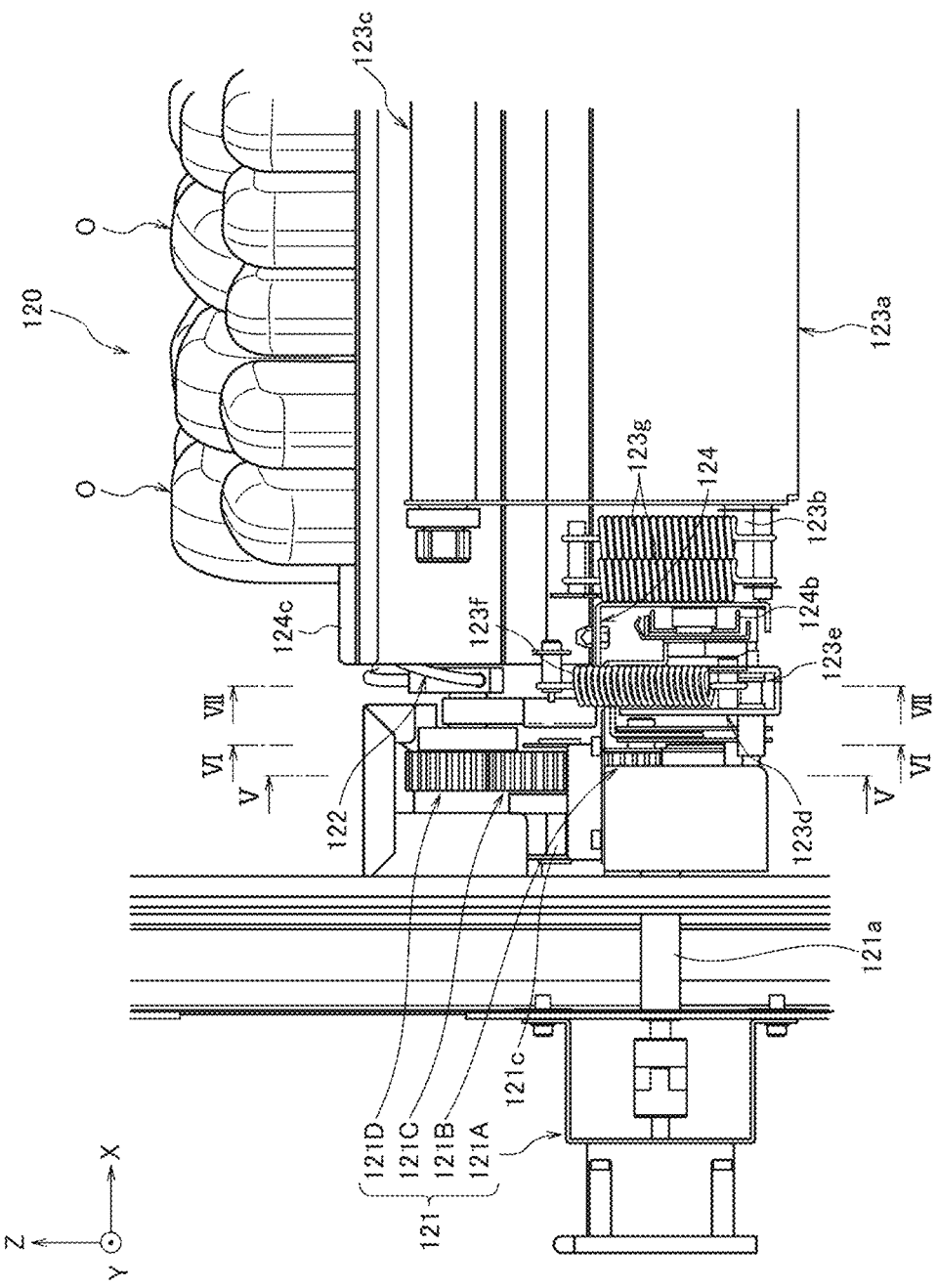
FIG. 3 is a detailed enlarged view of a section III in FIG. 2.

As illustrated in FIG. 3, each of the ingredient storage units 120 has a drive mechanism 121 coupled to a power source, a noodle feeding member 122 that feeds a frozen noodle block M, a transmission disengagement mechanism 123 that disengages or cuts off power transmission by the drive mechanism 121 to the noodle feeding member 122, and a tray 124 having a plurality of frozen noodle blocks M placed thereon.

(3) Specific Configuration of Drive Mechanism 121

Figure 4A:
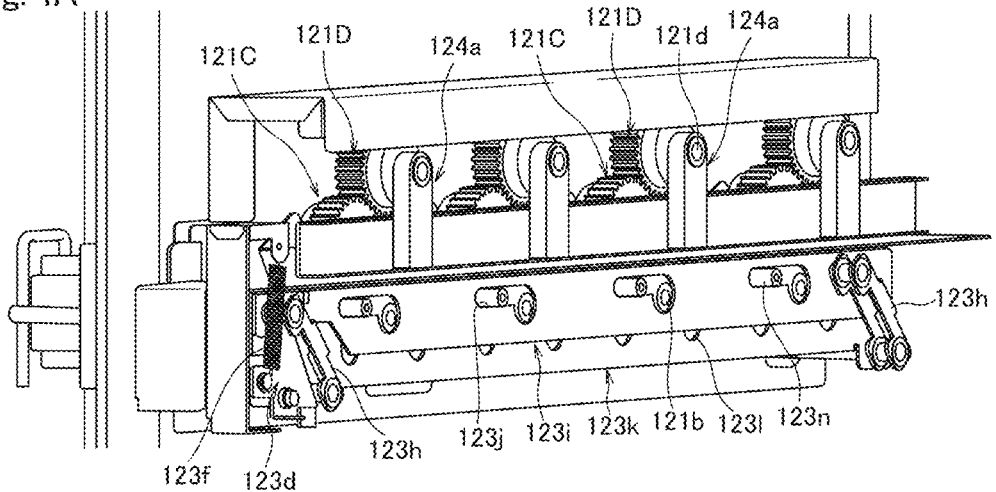
FIG. 4A is a perspective view illustrating a partial structure of an ingredient storage unit in the frozen noodle supplying device in FIG. 1.
Figure 4B:
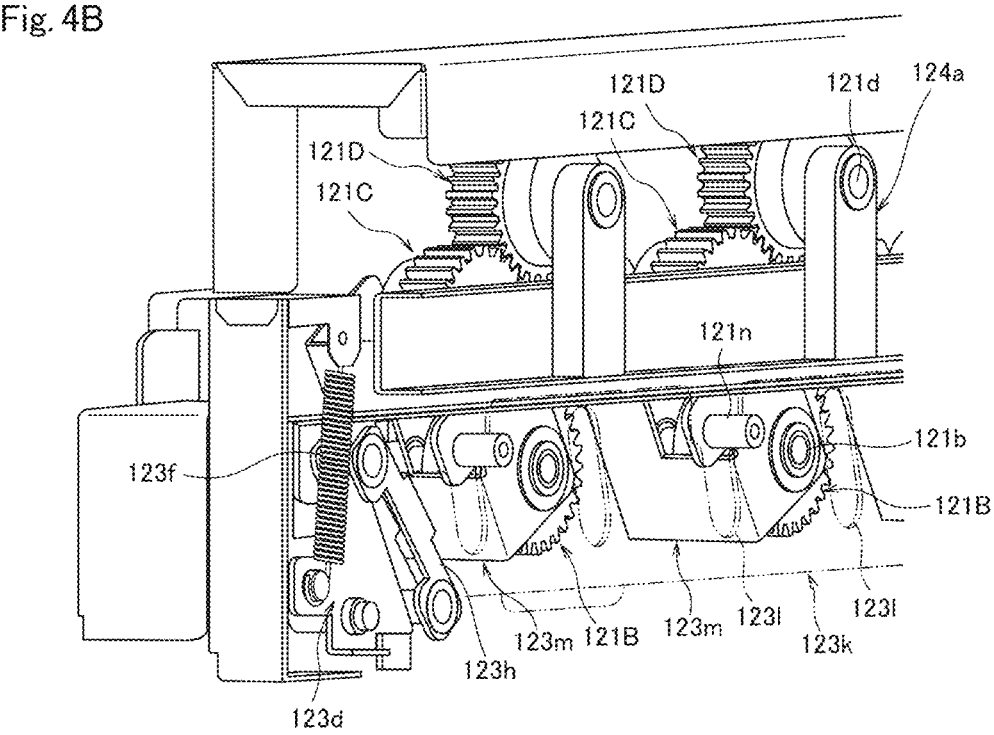
FIG. 4B is an enlarged perspective view of a part of FIG. 4A.

As illustrated in FIGS. 3, 4A, and 4B, the drive mechanism 121 includes the drive motor 121A provided outside the temperature-retention cabinet body 110, a driving gear 121B as a driving transmission member, a coupling gear 121C as a coupling transmission member, and a driven gear 121D as a driven transmission member.

In this example, gears are used as the driving transmission member, the coupling transmission member, and the driven transmission member. However, as long as power can be transmitted, for example, friction wheels may be used.

The driving gear 121B has a driving gear shaft 121b connected to a drive motor shaft 121a of the drive motor 121A with the shaft center matched.

The coupling gear 121C is provided in a pivot member 123m described later so as to be rotatable around a coupling gear shaft 121c and in mesh with the driving gear 121B.

With this configuration, the coupling gear 121C is rotated in conjunction with the driving gear 121B when it is driven to rotate by the drive motor 121A.

The driven gear 121D is pivotally supported in a rotatable manner by a driven gear bearing portion 124a provided in the tray 124.

Four drive mechanisms 121 are arranged in a row in the pull-out direction of the tray 124 so as to correspond to four noodle feeding members 122 arranged in a row in the pull-out direction of the tray 124.

More specifically, four driven gear bearing portions 124a are arranged side-by-side in the tray pull-out direction (Y direction), and four noodle feeding members 122 connected to four driven gears 121D pivotally supported in a rotatable manner by the respective driven gear bearing portions 124a are arranged in a row in the tray pull-out direction (Y direction).

With this configuration, four rows of frozen noodle blocks M can be arranged on the tray 124 in the tray pull-out direction (Y direction), while a number of frozen noodle blocks M defined by the specifications of the noodle feeding members 122 are arranged in a row in the noodle feed direction (X direction).

In this example, a number of frozen noodle blocks M specified by the pitch in the axial direction of the noodle feeding member 122 are arranged in a row in the noodle feed direction (X direction).

Although four noodle feeding members 122 arranged in a row are described here, the present embodiment is not limited thereto. The number of noodle feeding members 122 only needs to be one or more. The noodle feeding member 122 on the front side accommodates small-sized frozen noodle blocks M. However, the present embodiment is not limited thereto. Frozen noodle blocks M of the same size in all may be accommodated, or frozen noodle blocks M of different sizes may be accommodated in different rows. When frozen noodle blocks M of different sizes are accommodated in different rows, the noodle feeding member 122 of the row corresponding to the order is driven to take out a frozen noodle block M of the size according to the customer's order, and a frozen noodle block M of the size according to the customer's order is taken out through the noodle supply door 113 and the supply guide 115.

(4) Specific Configuration of Noodle Feeding Member 122

The noodle feeding member 122 used in this example sequentially feeds multiple frozen noodle blocks M on the tray 124 toward the noodle supply door 113, and is a linear member shaped like a helix, that is, a spiral-shaped member, coupled to the driven gear 121D.

The spiral-shaped noodle feeding member 122 is capable of having a frozen noodle block M disposed for each pitch, where, when viewed from the direction of the driven gear shaft 121d, the pitch of each turn formed in a circle shape in the direction of the driven gear shaft 121d is one pitch.

Such a noodle feeding member 122 supports a frozen noodle block M such that a part of the linear member is in contact with the frozen noodle block M.

In other words, the noodle feeding member 122 supports the frozen noodle block M with a small contact area to prevent the unwrapped frozen noodle block M from sticking thereto and being damaged.

(5) Specific Configuration of Transmission Disengagement Mechanism 123

The transmission disengagement mechanism 123 disengages, that is, cuts off power transmission to the noodle feeding member 122 by the drive mechanism 121 to stop the frozen noodle block M in conjunction with pull-out operation of the tray 124.

Therefore, when the transmission disengagement mechanism 123 does not disengage power transmission to the noodle feeding member 122 by the drive mechanism 121, the frozen noodle block M is ready to be fed by the noodle feeding member 122.

The transmission disengagement mechanism 123 includes a lever mechanism 123A that is operated to pull out the tray 124 and to push back the tray 124 that has been pulled out, and a link mechanism 123B that converts the motion of the lever mechanism 123A into a motion of disengaging transmission of drive force by the drive mechanism 121 or into a motion of transmitting drive force by the drive mechanism 121.

(6) Specific Configuration of Lever Mechanism 123A

The lever mechanism 123A includes a lever body 123a that constitutes the main body, a lever rotation shaft 123b serving as the axis of rotation of the lever body 123a, an operating portion 123c to which external force for lever operation is applied, a link abutment portion 123d in abutment with a part of the link mechanism 123B, a lock portion 123e that locks the tray 124 to the temperature-retention cabinet body 110, a rotation spring 123f that elastically biases the link abutment portion 123d and the lock portion 123e, and a return spring 123g that elastically biases the lever body 123a to a predetermined posture about the lever rotation shaft 123b.

As illustrated in FIG. 3, the link abutment portion 123d and the lock portion 123e are integrally provided in the interior of the lever body 123a.

As illustrated in FIGS. 4 and 5, the link abutment portion 123d has a substantially triangular shape with an inclined abutment surface on which a first link member 123h of the link mechanism 123B abuts, and is pivotally supported in a rotatable manner inside the lever body 123a so as to be elastically biased by the rotation spring 123f to assume a predetermined posture.

The lock portion 123e, which is provided integrally with the link abutment portion 123d, is pivotally supported in a rotatable manner inside the lever body 123a so as to be elastically biased together with the link abutment portion 123d by the rotation spring 123f to assume a predetermined posture.

Figure 5A:
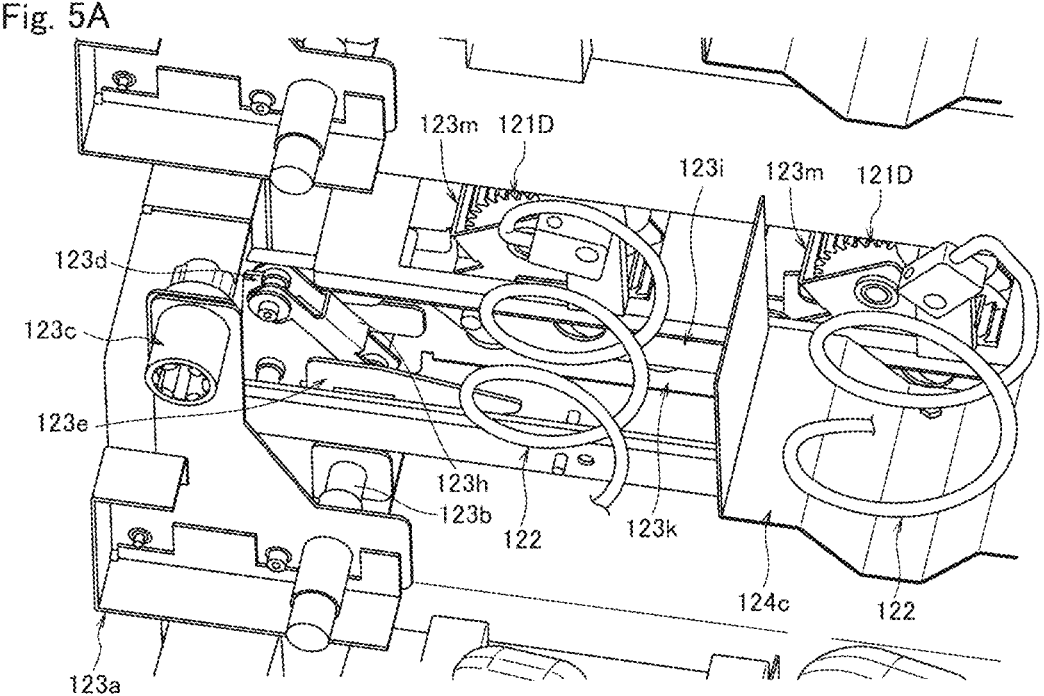
FIG. 5A is a perspective view illustrating a section around a lever mechanism which is a partial structure of the ingredient storage unit in the frozen noodle supplying device in FIG. 1.
Figure 5B:
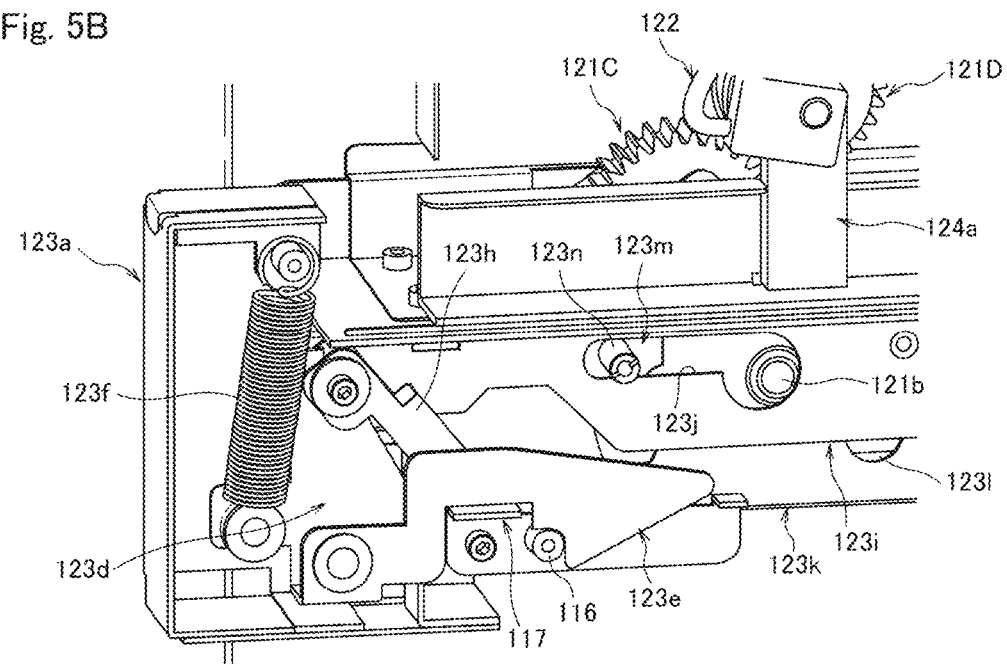
FIG. 5B is an enlarged view of a section around a lock portion in FIG. 5A.

As illustrated in FIG. 5B, the lock portion 123e has a distal end shaped like a hook. When the tray 124 is housed in the temperature-retention cabinet body 110, the lock portion 123e is biased by the rotation spring 123f to a predetermined posture and thereby engaged with a lock pin 116 provided on the temperature-retention cabinet body 110.

As illustrated in FIG. 5A, the lever rotation shaft 123b serving as the axis of rotation of the lever body 123a is fixed to the tray 124.

The operating portion 123c is an operating section of the lever mechanism 123A and is fixed to the lever body 123a like a rod extending across the lever body 123a in parallel with the lever rotation shaft 123b.

The rotation spring 123f elastically biases the link abutment portion 123d and the lock portion 123e such that the link abutment portion 123d and the lock portion 123e assume a predetermined posture within the lever body 123a.

The rotation spring 123f has one end latched on a part of the lever body 123a and the other end latched on a part of the link abutment portion 123d.

The return spring 123g elastically biases the lever body 123a such that the lever body 123a assumes a predetermined posture relative to the tray 124.

As illustrated in FIG. 3, the return spring 123g has one end latched on a part of the lever body 123a and the other end latched on a part of the tray 124.

(7) Specific Configuration of Link Mechanism 123B

As illustrated in FIG. 4A, the link mechanism 123B includes a pair of first link members 123h, a second link member 123i, a guide member 123k, and pivot members 123m.

Each of the first link members 123h has one end coupled to the second link member 123i by a revolute pair and the other end coupled to the temperature-retention cabinet body 110 by a revolute pair.

The second link member 123*i* is a strip-shaped member and has moving-side guide grooves 123*j* for guiding guide pins 123*n* provided on the respective pivot members 123*m*.

The first link members 123*h* and the second link member 123*i* constitute a so-called parallel link such that the first link members 123*h* are inclined to cause the second link member 123*i* to descend.

The guide member 123*k* is fixed to the temperature-retention cabinet body 110 and has a U-shaped wall in cross section to surround the pivot members 123*m* from below and from both sides.

The pivot member 123*m* (see FIG. 4B) is provided between both side walls of the guide member 123*k*.

One side wall of the guide member 123*k* has a fixed-side guide groove 123*l* in which the guide pin 123*n* of the pivot member 123*m* is guided.

That is, the guide pin 123*n* of the pivot member 123*m* is slidably inserted in the fixed-side guide groove 123*l* of the guide member 123*k* fixed to the temperature-retention cabinet body 110 and in the moving-side guide groove 123*j* of the second link member 123*i* in conjunction with the first link member 123*h*.

With this configuration, the guide pin 123*n* of the pivot member 123*m* is guided in the moving-side guide groove 123*j* moved with the descending motion of the second link member 123*i*, and in the fixed-side guide groove 123*l* of the fixed guide member 123*k*.

The pivot member 123*m* is provided between both side walls of the guide member 123*k* in a rotatable manner around the driving gear shaft 121*b* and pivotally supports the coupling gear 121C in a rotatable manner with the driving gear 121B and the coupling gear 121C meshed together.

The guide pin 123*n* described above is provided on an outer surface of the pivot member 123*m*, and external force applied via the guide pin 123*n* causes the pivot member 123*m* to pivot around the axis of the driving gear 121B to a position where the coupling gear 121C meshes with the driven gear 121D and to a position where the coupling gear 121C is separated from the driven gear 121D and the gear meshing is disengaged.

In such a link mechanism 123B, the self weight of the power transmission side of the driving gear 121B acts on the first link member 123*h*.

More specifically, the self weight of the coupling gear 121C meshed with the driving gear 121B and the self weight of the second link member 123*i* act on the first link member 123*h*.

With this configuration, one end side of the first link member 123*h* coupled to the second link member 123*i* rests and abuts on the link abutment portion 123*d* using the self weight of the coupling gear 121C and additionally the self weight of the second link member 123*i*.

In other words, the first link member 123*h* is operated to follow the link abutment portion 123*d* using the self weight of the coupling gear 121C and the self weight of the second link member 123*i*.

(8) Specific Configuration of Tray 124

The tray 124 has four driven gear bearing portions 124*a* described above each pivotally supporting the driven gear 121D in a rotatable manner, slide guides 124*b* provided on both sides to guide the tray 124 such that the tray 124 can be pulled out easily from the temperature-retention cabinet body 110, and a feed guide 124*c* that guides a frozen noodle block M such that the frozen noodle block M fed by the noodle feeding member 122 does not deviate from the feed direction.

(9) Operation of Frozen Noodle Supplying Device 100 Feeding and Supplying Frozen Noodle Block M First, when a customer orders noodles, the driving gear 121B is driven to rotate by the drive motor 121A of the drive mechanism 121, and the driven gear 121D is driven to rotate through the coupling gear 121C.

When the driven gear 121D is driven to rotate, a frozen noodle block M arranged in each pitch of the noodle feeding member 122 is fed in the feed direction along the axis of the driven gear 121D.

For example, frozen noodle blocks M are supplied in turn from the tray 124 on the top layer of three-layered trays 124 in the frozen noodle supplying device 100.

In other words, when the frozen noodle blocks M in the tray 124 on the top layer in the frozen noodle supplying device 100 run out, frozen noodle blocks M in the tray 124 on the second layer are supplied, and then the tray 124 on the third layer.

In the tray 124 on each layer, for example, frozen noodle blocks M are fed to the supply guide 115 one by one from the rightmost row of multiple rows and from the front of each row.

The frozen noodle block M fed to the supply guide 115 slides down a sloping surface of the supply guide 115 and is passed to the next processing device (not illustrated).

(10) Power Transmission Disengagement Operation of Frozen Noodle Supplying Device 100 by Transmission Disengagement Mechanism 123

The power transmission disengagement operation of the frozen noodle supplying device 100 in this example will be described with reference to FIG. 6A to 8.

Figure 6A:
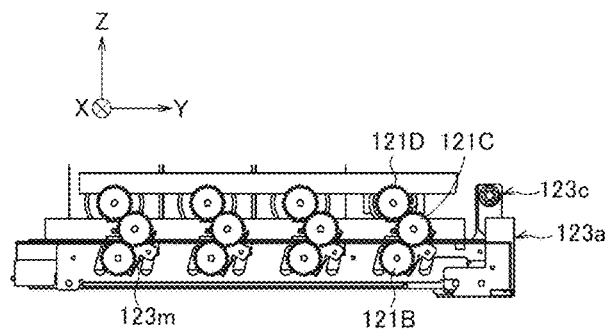
FIG. 6A to 6D are illustrations of operation to pull out a tray by lever operation.
Figure 6B:
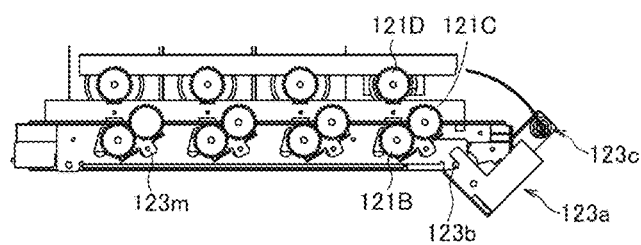
Figure 6C:
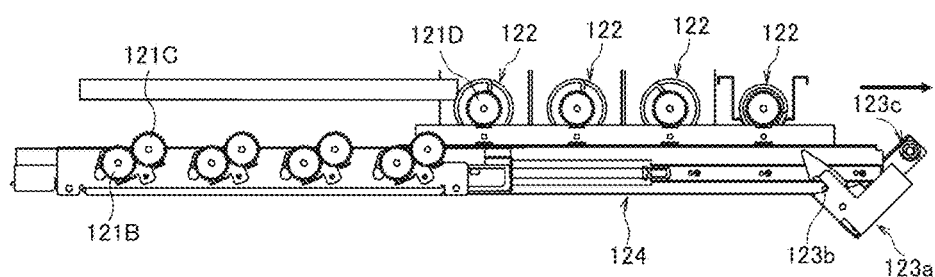
Figure 6D:
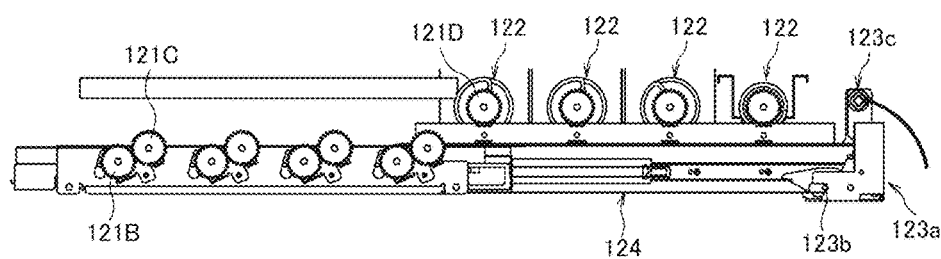
Figure 7A:
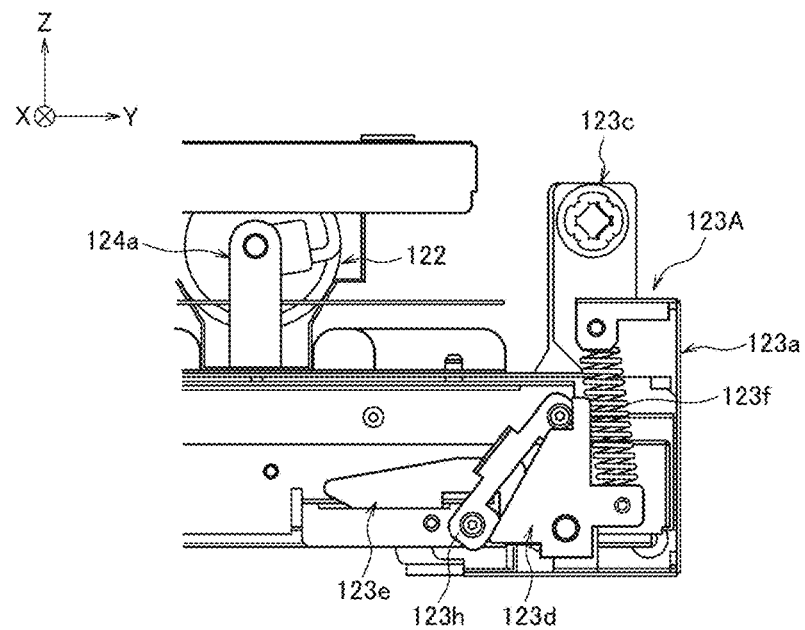
FIGS. 7A and 7B are illustrations of an operating state of a lever for pulling out the tray.
Figure 7B:
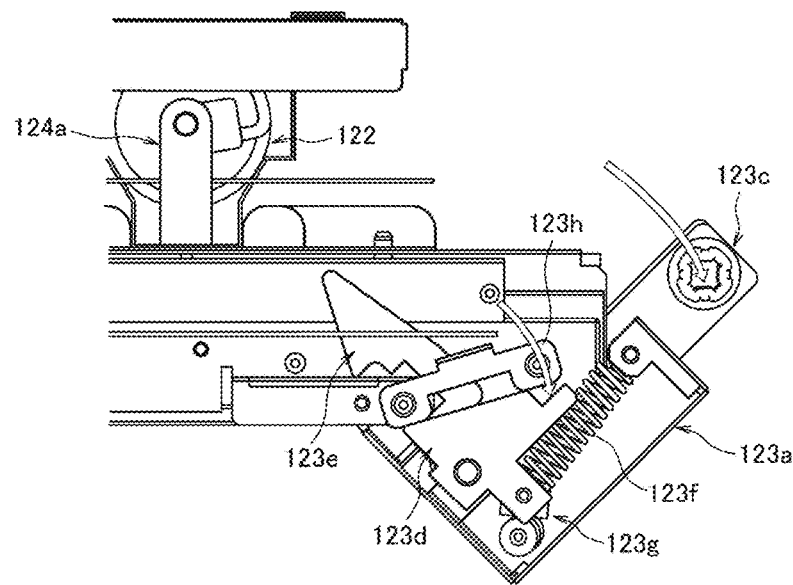
Figure 8:
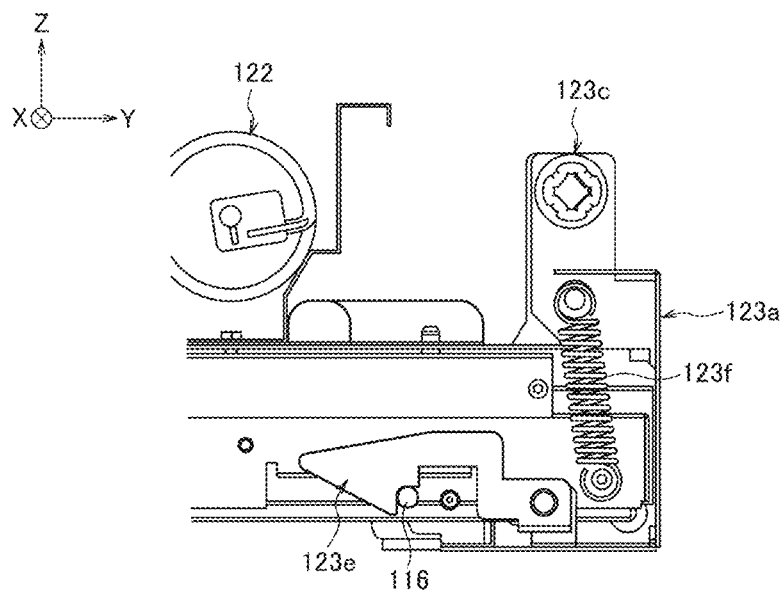
FIG. 8 is an illustration of lock release operation by lever operation for pulling out the tray.
Figure 8:
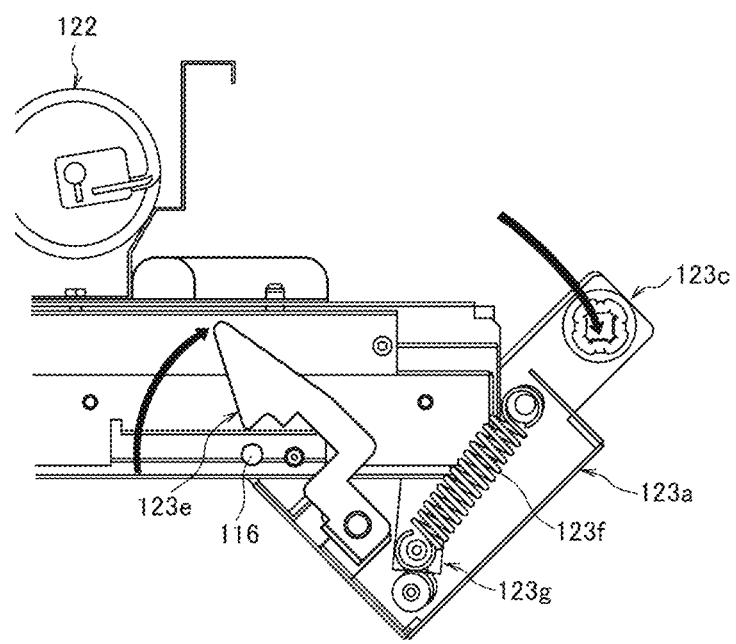

Here, FIG. 6A to 6D are illustrations of operation to pull out the tray 124 by lever operation, FIGS. 7A and 7B are illustrations of an operating state of the lever mechanism 123A for pulling out the tray 124, and FIG. 8 is an illustration of lock release operation by lever operation for pulling out the tray.

For example, when a display of the frozen noodle supplying device 100 displays information to indicate that one of three-layered trays 124 needs refilling with frozen noodle blocks M, the frozen noodle supplying device 100 is switched to a maintenance mode.

A worker then opens the refill door 114 and pushes down the operating portion 123*c* of the lever mechanism 123A provided for the tray 124 that needs refilling (see FIG. 6B).

When the operating portion 123*c* is pushed down by the worker, the lever body 123*a* is rotated around the lever rotation shaft 123*b*, and the link abutment portion 123*d* and the lock portion 123*e* in the lever body 123*a* are tilted with the rotation of the lever body 123*a* (see FIGS. 6B and 7B).

In this way, when the link abutment portion 123*d* tilts, the first link member 123*h* in abutment with the link abutment portion 123*d* using its self weight tilts so as to follow the link abutment portion 123*d*.

The second link member 123*i* coupled to the first link member 123*h* is then descended, and the guide pin 123*n* provided on the pivot member 123*m* is guided to move by the guide grooves 123*bf* and 123*bg* of the second link member 123*i* and the guide member 123*k*.

The movement of the guide pin 123*n* causes the pivot member 123*m* to pivot around the driving gear shaft 121*b* of the driving gear 121B, so that the coupling gear 121C is separated from the driven gear 121D such that the coupling gear 121C is unmeshed from the driven gear 121D, in other words, such that power transmission from the coupling gear 121C to the driven gear 121D is disengaged.

In this way, the separation of the coupling gear 121C from the driven gear 121D and the tilting of the lock portion 123e cause the lock portion 123e and the lock pin 116 to be disengaged from each other, so that the tray 124 becomes ready to be pulled out from the temperature-retention cabinet body 110.

In this way, with the coupling gear 121C separated from the driven gear 121D and with the lock portion 123e and the lock pin 116 disengaged from each other, the tray 124 is pulled out of the temperature-retention cabinet body 110 (see FIG. 6C).

At this time, the driven gear 121D unmeshed from the coupling gear 121C and the noodle feeding member 122 coupled to this driven gear 121D are pulled out together with the tray 124.

The tray 124 is thus pulled out with the driving gear 121B, the coupling gear 121C, the link mechanism 123B, and the like remaining in the temperature-retention cabinet body 110.

When the operator stops applying external force to the operating portion 123c after pulling out the tray 124 in this manner, the lever body 123a is rotated around the lever rotation shaft 123b by the elastic restoring force of the return spring 123g to return to the posture before the pull-out operation of the tray 124 (see FIG. 6D).

As a result, the link abutment portion 123d and the lock portion 123e in the lever body 123a are returned to the posture before the pull-out operation of the tray 124.

In this way, with the tray 124 pulled out of the temperature-retention cabinet body 110, the tray 124 is refilled with frozen noodle blocks M, or frozen noodle blocks M are taken out of the tray 124.

Here, the tray pull-out direction (Y direction) is the direction that intersects with the feed direction (X direction) and in which another device in the integrated line is less likely to be arranged in proximity, and space is ensured relatively easily. The tray 124 therefore can be pulled out with sufficient space ensured, and frozen noodle blocks M can be easily taken out and refilled even at the far end position of the tray 124 in the pull-out direction.

Furthermore, since the noodle feeding member 122 is pulled out together with the tray 124, frozen noodle blocks M can be aligned and placed on the tray 124 for each pitch of the noodle feeding member 122.

When refilling of the tray 124 with frozen noodle blocks M is completed, the operating portion 123c, which has been returned by the return spring 123g to the posture before the pull-out operation of the tray 124, is pushed in the opposite direction of the pull-out direction, so that the tray 124 is returned into the temperature-retention cabinet body 110.

When the pushing operation on the operating portion 123c is performed, the inclined surface of the link abutment portion 123d returned to an upright position starts abutting on one end side of the first link member 123h in a tilted state, and the first link member 123h slides on and is raised by the inclined surface of the link abutment portion 123d.

The second link member 123i is then ascended in conjunction with the rising motion of the first link member 123h, the guide pin 123n of the pivot member 123m is guided by the moving-side guide groove 123j of the second link member 123i and the fixed-side guide groove 123l of the guide member 123k, and the pivot member 123m is pivoted around the driving gear shaft 121b, whereby the coupling gear 121C is meshed with the driven gear 121D.

This operation brings back a state that allows power transmission from the driving gear 121B to the driven gear 121D through the coupling gear 121C.

On the other hand, when the operating portion 123c is pushed, the lock portion 123e, which has been returned to the posture before the pull-out operation of the tray 124, has its distal end abutted and lifted by a body abutment portion 117 (see FIG. 5B), and then the lock portion 123e is returned to the posture before the pull-out operation by the elastic restoring force of the rotation spring 123f at a position beyond the body abutment portion 117, and engaged with the lock pin 116.

<Effects of Frozen Noodle Supplying Device 100 in this Example>

Since the frozen noodle supplying device 100 in this example as described above includes the temperature-retention cabinet body 110 that accommodates multiple frozen noodle blocks M to be used for pasta dishes at a retained temperature, the ingredient storage unit 120 provided in the interior of the temperature-retention cabinet body 110 to store multiple frozen noodle blocks M, the tray 124 mounted in the ingredient storage unit 120 and having multiple frozen noodle blocks M aligned and placed thereon, the noodle supply door 113 provided on the temperature-retention cabinet body 110 and openable and closable on the side of another device such as a heat-cooking device installed adjacently, and the refill door 114 provided on the temperature-retention cabinet body 110 to allow the tray 124 to be refilled with frozen noodle blocks M, multiple frozen noodle blocks M are accommodated at a retained temperature in the temperature-retention cabinet body 110, frozen noodle blocks M individually aligned and placed on the tray 124 of the ingredient storage unit 120 in the temperature-retention cabinet body 110 can be supplied to a heat-cooking device, which is the side of another device, through the noodle supply door 113 of the temperature-retention cabinet body 110, and the temperature-retention cabinet body 110 can be refilled with new frozen noodle blocks M through the refill door 114 of the temperature-retention cabinet body 110. In addition, the frozen noodle blocks M in the frozen noodle supplying device 100 are not exposed inadvertently to the external air-conditioned environment, so that beta formation of starch, which is the main ingredient of pasta, is prevented, thus maintaining the unique flavor of frozen noodle blocks M, and sufficient sanitary control for accommodating frozen noodle blocks M to be used for pasta dishes can be achieved.

Furthermore, since the ingredient storage unit 120 includes the noodle feeding member 122 that sequentially feeds multiple frozen noodle blocks M on the tray 124 toward the noodle supply door 113, space for refilling of frozen noodle blocks M is ensured on the refill door 114 side, which is the front side of the temperature-retention cabinet body 110, and thus unlike the conventional automatic noodle dish serving system, refilling of frozen noodle blocks M from the heat-cooking device side or the opposite side thereof, that is, the upstream side, of the noodle supplying device is avoided, thereby reducing the installation space of the automatic noodle dish serving system and expanding the degree of freedom of its physical installation location.

Furthermore, since the tray 124 is provided so as to be pulled out from the interior of the temperature-retention cabinet body 110 toward the refill door 114 in the tray pull-out direction that intersects with the noodle feed direction of the noodle feeding member 122, refilling the frozen noodle supplying device 100 with frozen noodle blocks M is performed on the front side of the frozen noodle supplying device 100, which is the refill door 114 side different from the side on which frozen noodle blocks M are supplied from the frozen noodle supplying device 100 to the heating cooking device, so that quick and easy refilling operation of frozen noodle blocks M can be achieved.

Starch aging (beta formation) tends to occur at temperatures around between 0 and 10° C. However, the above configuration that lets less cold air escape maintains the temperature inside the temperature-retention cabinet body 110 at a low temperature, thereby preventing the beta-formation of starch which is the main ingredient of pasta. Furthermore, the trays 124 are divided into multiple layers, and only the tray 124 on the layer that requires refilling can be pulled out during refilling, so that other frozen noodle blocks M under temperature retention can always be maintained at a predetermined temperature. In addition, a plurality of noodle supply doors 113 are also provided, and only the noodle supply door 113 on the layer corresponding to the frozen noodle blocks M to be taken out is opened, so that the temperature inside the temperature-retention cabinet body 110 is always easily maintained at a predetermined temperature.

Furthermore, in the frozen noodle supplying device 100, since the ingredient storage unit 120 includes the drive mechanism 121 that drives the noodle feeding member 122 and the transmission disengagement mechanism 123 that disengages the drive mechanism 121 in conjunction with the pull-out operation of the tray 124, the power transmission of the drive mechanism 121 to the noodle feeding member 122 is disengaged to stop the supply operation of the noodle feeding member 122 at the same time as the pull-out operation of the tray 124, so that the tray 124 that has been pulled out can be refilled with frozen noodle blocks M reliably and safely.

Furthermore, in the frozen noodle supplying device 100, since the drive mechanism 121 has the driving gear 121B coupled to a power source and the driven gear 121D that transmits the power of the driving gear 121B to the noodle feeding member 122, the driven shaft of the driven gear 121D is arranged along the noodle feed direction, and the tray 124 can be pulled out together with the noodle feeding member 122, the noodle feeding member 122 is pulled out together with the tray 124, so that reliable removal and refilling of frozen noodle blocks M can be sequentially achieved by pulling out the tray 124 with the noodle feeding member 122 held on the tray 124 and following the noodle feeding member 122, and removal and refilling of frozen noodle blocks M can be performed in a short time more easily without effort. As a result, deterioration of frozen noodle blocks M and contamination from the external air-conditioned environment can be suppressed during removal and refilling of frozen noodle blocks M to be used for pasta dishes.

Furthermore, in the frozen noodle supplying device 100, since the transmission disengagement mechanism 123 has the lever mechanism 123A that performs pull-out operation of the tray 124 and the link mechanism 123B that disengages power transmission from the driving gear 121B to the driven gear 121D by this lever mechanism 123A, the power transmission from the driving gear 121B to the driven gear 121D is disengaged by lever operation, so that the tray 124 can be pulled out easily and quickly, and as a result, deterioration of frozen noodle blocks M and contamination from the external air-conditioned environment can be suppressed more during removal and refilling of frozen noodle blocks M.

Furthermore, in the frozen noodle supplying device 100, since the lever mechanism 123A includes the lock portion 123e that can lock the housed position of the tray 124 within the temperature-retention cabinet body 110, when the lever mechanism 123A is not operated by lever operation, the tray 124 is reliably and safely housed and fixed in the temperature-retention cabinet body 110, so that the tray 124 is prevented from accidentally popping out of the temperature-retention cabinet body 110, whereas when the lever mechanism 123A is operated by lever operation, power transmission from the driving gear 121B to the driven gear 121D is disengaged and at the same time the locking by the lock portion 123e is released to stop the supply operation of the noodle feeding member 122, so that the tray 124 can be smoothly pulled out from inside the temperature-retention cabinet body 110 while the supply operation of the noodle feeding member 122 is completely stopped.

Furthermore, in the frozen noodle supplying device 100, since the lever mechanism 123A is provided inside the refill door 114 that opens and closes the pull-out-side opening 112 for the tray 124 of the temperature-retention cabinet body 110, the disengagement operation of power transmission from the driving gear 121B to the driven gear 121D and the pull-out operation of the tray 124 are instantly performed by a single action with the lever mechanism 123A provided inside the refill door 114, so that the accommodated state of frozen noodle blocks M in the temperature-retention cabinet body can be controlled in a more sanitary manner in removal and refilling of frozen noodle blocks M.

In the above example, the trays 124 in three layers are illustrated by way of example, but the number of layers of trays 124 only needs to be one or more.

In the above example, the first link member 123h is operated to follow the link abutment portion 123d using the self weight of the coupling gear 121C and the self weight of the second link member 123i to disengage power transmission by the drive mechanism 121 to the noodle feeding member 122. However, this example is not limited to this. The first link member 123h may be operated to follow the link abutment portion 123d using biasing means such as a spring to apply biasing force to the coupling gear 121C and the second link member 123i downward.

This biasing means may employ any arrangement as long as biasing force can be applied to the second link member 123i downward. Instead of or in addition to the biasing means, an external force biasing means may be employed to apply biasing force to the link mechanism 123B using external force exerted with the tray pull-out operation.

In the example above, the refill door 114 is a single door, but the refill door 114 is not limited to a single door and may be constituted with a plurality of refill doors 114. For example, three refill doors 114 may be provided corresponding to three-layered trays 124, and only one of the refill doors 114 corresponding to the tray 124 to be pulled out may be opened and closed.

Opening and closing of only the refill door 114 corresponding to the tray 124 to be pulled out in this manner can suppress release of cold air from the interior of the temperature-retention cabinet body 110 more effectively.

The description has been given to an embodiment of the frozen noodle supplying device according to the present invention, but the present invention is not limited to this embodiment. In addition, the present invention can be implemented with various improvements, modifications, and changes based on the knowledge of those skilled without departing from the spirit of the invention.

The invention claimed is:

1. A cooking ingredient supplying device comprising: a body configured to accommodate a plurality of ingredients; an ingredient storage unit disposed in interior of the body and configured to store the ingredients; a tray mounted in the ingredient storage unit, the ingredients being aligned and placed on the tray; an ingredient supply door disposed on the body and openable and closable on a side of another device installed adjacently;

and a refill door disposed on the body and configured to allow the tray to be refilled with the ingredients, wherein the ingredient storage unit includes an ingredient feeding member configured to feed the ingredients on the tray toward the ingredient supply door, the tray is disposed so as to be pulled out from interior of the body toward the refill door in a tray pull-out direction that intersects with an ingredient feed direction of the ingredient feeding member, the ingredient storage unit includes a drive mechanism configured to drive the ingredient feeding member and a transmission disengagement mechanism configured to disengage the drive mechanism in conjunction with pull-out operation of the tray, the drive mechanism includes a driving transmission member coupled to a power source and a driven transmission member configured to transmit power of the driving transmission member to the ingredient feeding member, and the transmission disengagement mechanism includes a lever mechanism configured to perform pull-out operation of the tray and a link mechanism configured to disengage power transmission from the driving transmission member to the driven transmission member by the lever mechanism.

2. The cooking ingredient supplying device according to claim 1, wherein the driven transmission member has a driven shaft disposed along the ingredient feed direction, and the tray is capable of being pulled out together with the ingredient feeding member.

3. The cooking ingredient supplying device according to claim 1, wherein the lever mechanism includes a lock portion capable of locking a housed position of the tray within the temperature-retention cabinet body.

4. The cooking ingredient supplying device according to claim 1, wherein the lever mechanism is disposed inside the refill door.

* * * * *